United States Patent
Gonzales et al.

(10) Patent No.: US 11,075,962 B2
(45) Date of Patent: *Jul. 27, 2021

(54) SWITCHING OF CONNECTION PROTOCOL

(71) Applicant: Microsoft Technology Licensing, LLC, Redmond, WA (US)

(72) Inventors: Darren Gonzales, Monroe, WA (US); Jonathan Prudhomme, Redmond, WA (US); Joseph Warren, Renton, WA (US); Allie Sousa, Redmond, WA (US); Robert Novitskey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,085

(22) Filed: Sep. 13, 2019

(65) Prior Publication Data

US 2020/0007595 A1 Jan. 2, 2020

Related U.S. Application Data

(63) Continuation of application No. 14/089,583, filed on Nov. 25, 2013, now Pat. No. 10,440,066.

(60) Provisional application No. 61/905,045, filed on Nov. 15, 2013.

(51) Int. Cl.
*H04L 29/06* (2006.01)
*H04L 29/08* (2006.01)
*H04L 12/24* (2006.01)

(52) U.S. Cl.
CPC ........ *H04L 65/1069* (2013.01); *H04L 67/142* (2013.01); *H04L 69/08* (2013.01); *H04L 41/022* (2013.01); *H04L 41/0226* (2013.01)

(58) Field of Classification Search
CPC ... H04L 65/1069; H04L 67/142; H04L 69/08; H04L 41/022; H04L 41/0226
See application file for complete search history.

(56) References Cited

U.S. PATENT DOCUMENTS

| | | | |
|---|---|---|---|
| 2003/0140180 A1* | 7/2003 | Brown | H04L 67/02 719/330 |
| 2004/0249915 A1* | 12/2004 | Russell | H04W 88/06 709/223 |
| 2004/0268118 A1* | 12/2004 | Bazan Bejarano | H04L 63/0807 713/151 |

FOREIGN PATENT DOCUMENTS

FR 2844414 A1 * 3/2004 ............ H04L 69/24

OTHER PUBLICATIONS

"Office Action Issued in Indian Patent Application No. 201647000654", dated Sep. 26, 2019, 7 Pages.

(Continued)

*Primary Examiner* — Soe Hlaing

(57) ABSTRACT

Methods and systems are provided for switching protocols at a local client without having to delete the existing client account and without having to create a new client account that specifies the new protocol. The client an application executing on the client is configured with the capability to dynamically switch between protocols. For example, the client or an application executing on the client may employ a remote procedure call (RPC) protocol and may dynamically switch to a hypertext transfer (HTTP) protocol or vice versa upon request of the server.

20 Claims, 9 Drawing Sheets

(56) References Cited

OTHER PUBLICATIONS

"Office Action Issued in Korean Patent Application No. 10-2016-7005533", dated Jul. 30, 2020, 6 Pages.

* cited by examiner

SWITCHING OF CONNECTION PROTOCOL

CROSS REFERENCE TO REPLATED APPLICATION

This application is a continuation of U.S. application Ser. No. 14/089,583, filed Nov. 25, 2013, and titled "SWITCHING OF CONNECTION PROTOCOL," which claims the benefit of U.S. Provisional Patent Application No. 61/905,045, filed Nov. 15, 2013, the disclosures of which are hereby incorporated herein by reference.

BACKGROUND

In a communications environment, a client/server relationship is often used to interconnect services that may be distributed across different remote locations. Often times a user may execute an application locally on a client device and the application may retrieve data from a remote server connected to the client device over a network. In an example scenario, after a connection is established between the client device and the server, the application may forward a request to the server, and the server may in turn send a request to a database to retrieve requested data and information. The server may return the retrieved data to the client device which may display the information to the user and enable the user to interact with the data.

A communication protocol is used to facilitate communication between a local client to a remote server. For example, the communication protocol may be a remote procedure call (RPC) protocol or a hypertext transfer protocol (HTTP). However, the server may want to switch the protocol being utilized for communication between the client and the server. In order for the client to switch protocols, the existing client account has to be deleted and a new client account has to be created that specifies the new protocol. The creation of a new account increases the load on the server because all data needed for the client must be downloaded anew. Additionally, the deletion and creation of a new account ends the connection between the server and the client preventing data exchange and use of the client by the end user. For example, an end user may be prevented from accessing an email application during the deletion of the client account and the creation of the new client account that specifies the new protocol.

It is with respect to these and other general considerations that embodiments have been made. Also, although relatively specific problems have been discussed, it should be understood that the embodiments should not be limited to solving the specific problems identified in the background.

SUMMARY

In summary, the present disclosure relates to switching of connection protocols by a local client. In particular, the present disclosure relates generally to methods and systems for switching protocols at a local client without having to delete the existing client account and without having to create a new client account that specifies the new protocol. The client an application executing on the client is configured with the capability to dynamically switch between protocols.

In a first aspect, a method includes dynamically switching communication protocols. The method also includes:
  communicating with a server using a first protocol;
  receiving data from the server for implementing a second protocol;
  comparing the data to specifications; and
  based upon the comparison, reestablishing a communication connection with the server.
The first protocol and the second protocol are different.

In a second aspect, a system includes a client for data exchange with a server executed at least in part by a computing device. The computing device includes at least one processor and a memory that contains computer-executable instructions. When executed, the computer-executable instructions cause the processor to perform a method including:
  establishing a communication connection with the server using a first protocol by the client;
  receiving data from the server for a second protocol;
  determining that the data meets specifications of the client; and
  based on the determination, switching from using the first protocol to using the second protocol when reestablishing the communication connection with the server.
The first protocol and the second protocol are different.

In a third aspect, a computer-readable storage medium comprising computer-executable instructions stored thereon is disclosed. When executed by a computing system, the computer-executable instructions cause the processor to perform a method. The method includes:
  communicating with a server using a first protocol;
  sending a notice to the server that the client is capable of switching protocols;
  receiving data from the server for implementing a second protocol based on the notice;
  changing a connection process of the client based on the request;
  restarting the client after the connection process is changed;
  reestablishing a communication connection with the server, wherein the reestablishing of the communication connection comprises:
    finding the data for the second protocol;
    determining that the data meets specifications;
    storing the data; and
    using the data to reestablish the communication connection using the second protocol; and
  communicating with the server in the second protocol over the communication connection.
The first protocol and the second protocol are different.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures in which.

DETAILED DESCRIPTION

Figure 1:
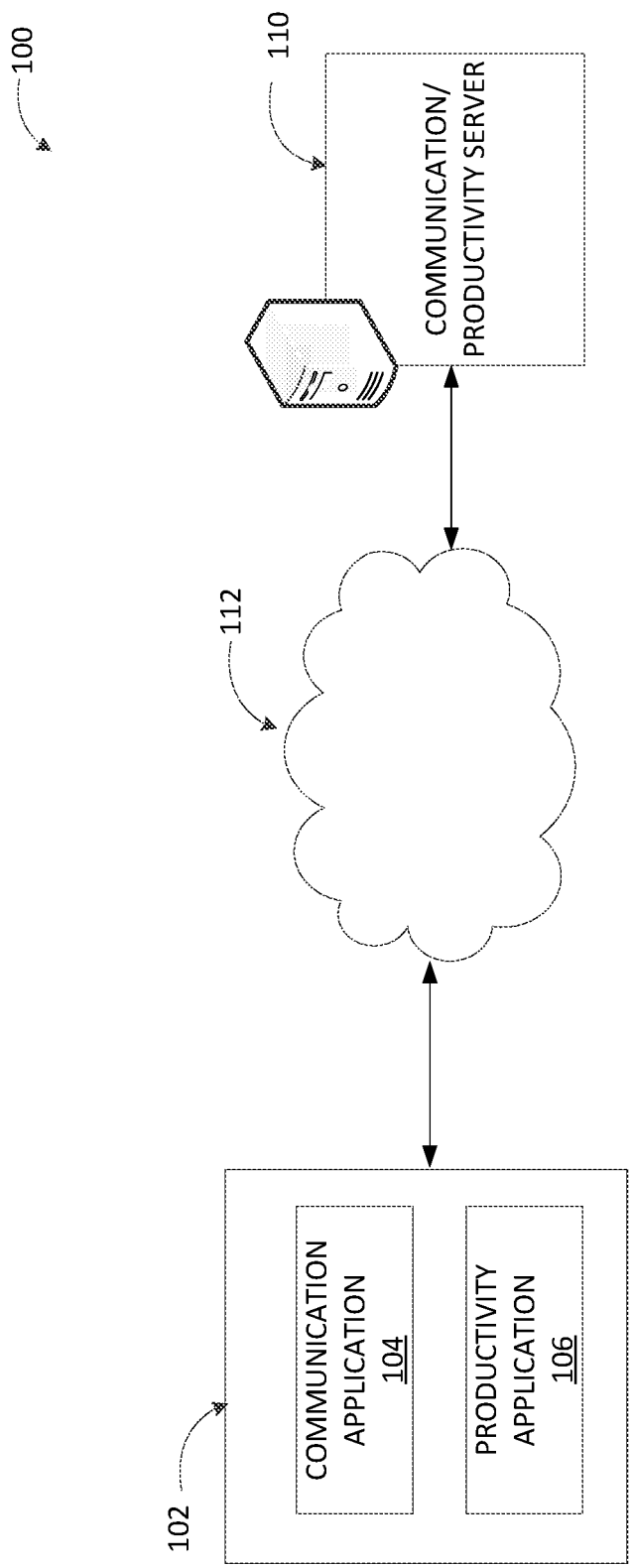
FIG. 1 illustrates an exemplary system where a client may access data or services provided by a server over a network, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

Throughout this specification, the term "platform" may be a combination of software and hardware components for providing data exchange over a protocol between a client and a server over a network. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

As briefly described above, embodiments of the present disclosure are directed to dynamic switching of connection protocols. In particular, the present disclosure relates generally to methods and systems for switching data transfer protocols at a local client without having to delete the existing client account and without having to create a new account that specifies the new protocol. In embodiments, an underlying data transfer protocol used to communicate data between a client and a server may be changed without resetting an application, process, account, etc. For example, embodiments of the present disclosure provide for the changing of a protocol used to communicate data between a client email application on a client device and a server. In embodiments, the data communication protocols, also referred to herein as "protocols," can include, but are not limited to, the Remote Procedure Call (RPC) protocol, the Hypertext Transfer (HTTP) protocol, the Post Office Protocol (POP3), the Internet Message Access Protocol (IMAP), etc. One of skill in the art will appreciate that any type of protocol can be employed with the various embodiments disclosed herein. Additionally, one of skill in the art will appreciate that communications or requests based on one protocol may travel over another protocol. For example, communications structured based on a RPC protocol may travel over an HTTP protocol and vice versa.

In general, a protocol is used to exchange data between a client and a server. However, at some point, it may be advantageous for the client, the server, or both to switch the protocol being utilized for communication. For example, the server may be updated to communicate over a HTTP protocol instead of a currently utilized RPC protocol. The RPC protocol may sometimes be used to forward a request from a local client to a remote server to retrieve data. The RPC protocol, however, may involve complex coding and may require specialized configurations on the client and/or the server to successfully exchange data. Additionally, some servers may become overloaded when a large quantity of users employ the RPC protocol for accessing data, due to the multiple redundancy of the RPC protocol. When servers become overloaded, users can lose established connections and may be unable to reconnect, which may reduce an overall quality of experience for user, and may prevent the user from accessing data through the client application. Accordingly, a server may be updated to communicate over a HTTP protocol to mitigate and/or eliminate some of the above limitations associated with the RPC protocol. However, the server cannot utilize the new protocol until the client, or an application or process on the client, is also updated to communicate over the HTTP protocol. In alternative embodiments, the RPC protocol may be advantageous for certain applications when compared to the HTTP protocol, so the client and/or server may switch from an HTTP protocol to an RPC protocol. While the HTTP protocol and the RPC protocol are discussed herein in detail, the disclosed systems and methods may be employed using different types of protocols.

Previously, the local client had to delete the existing client account and create a new client account that specifies the new protocol to change protocols. The creation of the new account increases the load on the server because all data for the newly created client account must be downloaded again. Additionally, the deletion and creation of a new client account with existing protocols prevents the local client from engaging in any data exchange until the new client account is created. Further, the deletion of the old client account and the creation of the new client account that specifies the new protocol require an end user to perform additional functions.

To address the above limitations, the clients and/or servers of the present disclosure are capable of switching between protocols without requiring creation of a new account. Previously, a client was required to find existing stored data for a protocol before configuring a service and attempting to connect to the server. In the disclosed embodiments, the client may comprise one or more processes, modules, components, etc., such as a Protocol Switch Notifier and/or a Logon Helper, that allow the client to check for new protocol data and reconfigure a service before attempting to connect to the server using the appropriate stored protocol data.

In other words, a client employing the systems and methods of the present disclosure may receive information about a new protocol to switch to and then determine if the application, client, and/or server are capable of employing or otherwise support the new protocol. If the application, client, and/or server are capable of employing the new protocol, then the client may switch to the new protocol. If any of the parties are not capable of supporting the new protocol, the client may continue to use the existing protocol. In embodiments, the client does not have to delete an existing account and create a new account that specifies the new protocol to change protocols, and consequently does not increase the load on the server and mitigates and/or eliminates interruption in data exchange with the server and the need for end user action.

FIG. 1 illustrates an example system 100 where a client device 102 may access productivity and/or communication services over a network, according to some embodiments disclosed herein. The computing devices and computing environments shown in FIG. 1 are for the sake of illustration. One of skill in the art will appreciate that the embodiments disclosed herein may be implemented in various local, networked, and similar computing environments employing a variety of computing devices and systems.

As illustrated in system 100, a client device 102 may employ a variety of different applications for exchanging and/or interacting with data. Example applications executed at a client device for interacting with data may be one or more productivity application 106 (e.g., a word processor, a presentation applications, a spreadsheet application, etc.) and one or more communication applications 104 (e.g., email applications, instant messaging applications, video streaming applications, etc.) or any applications that require a client device and a server to communication (e.g., banking applications, internal company applications, and etc.). Example client devices may include a desktop computer, a laptop computer, a tablet, a mobile phone, a smartphone, an electronic whiteboard, and/or other similar client devices. The communication service and the productivity service may also work in conjunction to retrieve and exchange email and other data. Additionally, while FIG. 1 illustrates a single client 102 and server 110, one of skill in the art will appreciate that embodiments of the present disclosure may include multiple client devices interacting with multiple servers 110.

An example productivity application 106 may be configured to provide access to various services built around a productivity platform. In embodiments, the services may be locally executed or hosted on a remote device, such as server 110. Some productivity services may include, but are not limited to, a collaboration application, an enterprise management application, a messaging application, a word processing application, a spreadsheet application, a database application, a presentation application, etc. The productivity service 106 may provide access to data associated with the various productivity applications hosted on a remote device by retrieving the data, for example, from a remote server 110. The server 110 may be accessed over a network 112, which may be a wired or wireless network, or a cloud network, and the retrieved data may be loaded, manipulated, or otherwise accessed at a user's local client device executing the productivity service 106. Exemplary networks may include, but are not limited to, cellular data networks, working area networks (WANs), local area networks (LANs), and the Internet.

Similarly, an example communication application 104 may be an application or service configured to provide email, contacts management, and/or calendar services. In embodiments, the communication application 104 may also provide one or more real-time communications platforms, such as instant messaging, audio/visual conferencing, and presence detection. For example, a user may receive, view and reply to emails using the communication application 104 executed on the client 102.

The services and/or functionality provided by the communication application 104 and the productivity application 106 may be hosted at an external server capable of communicating or otherwise exchanging data with the communication application 104 and/or the productivity application 106, and a user may access the provided services and/or functionality locally at a client device 102 over the network 112. Additionally, data may be exchanged between the local client device and the server over the network 112, such that the local client device may have an active connection with the server 110 over the network to access and interact with data provided by the communication application 104 and the productivity application 106.

The client 102, using communication application 104, the productivity application 106, or other types of applications or processes may issue a number of requests to the server 110 to retrieve data stored on the server 100 or stored in a data store accessible by the server 110. The client 110 and the server 112 may employ a protocol to exchange data between the devices.

Figure 2:
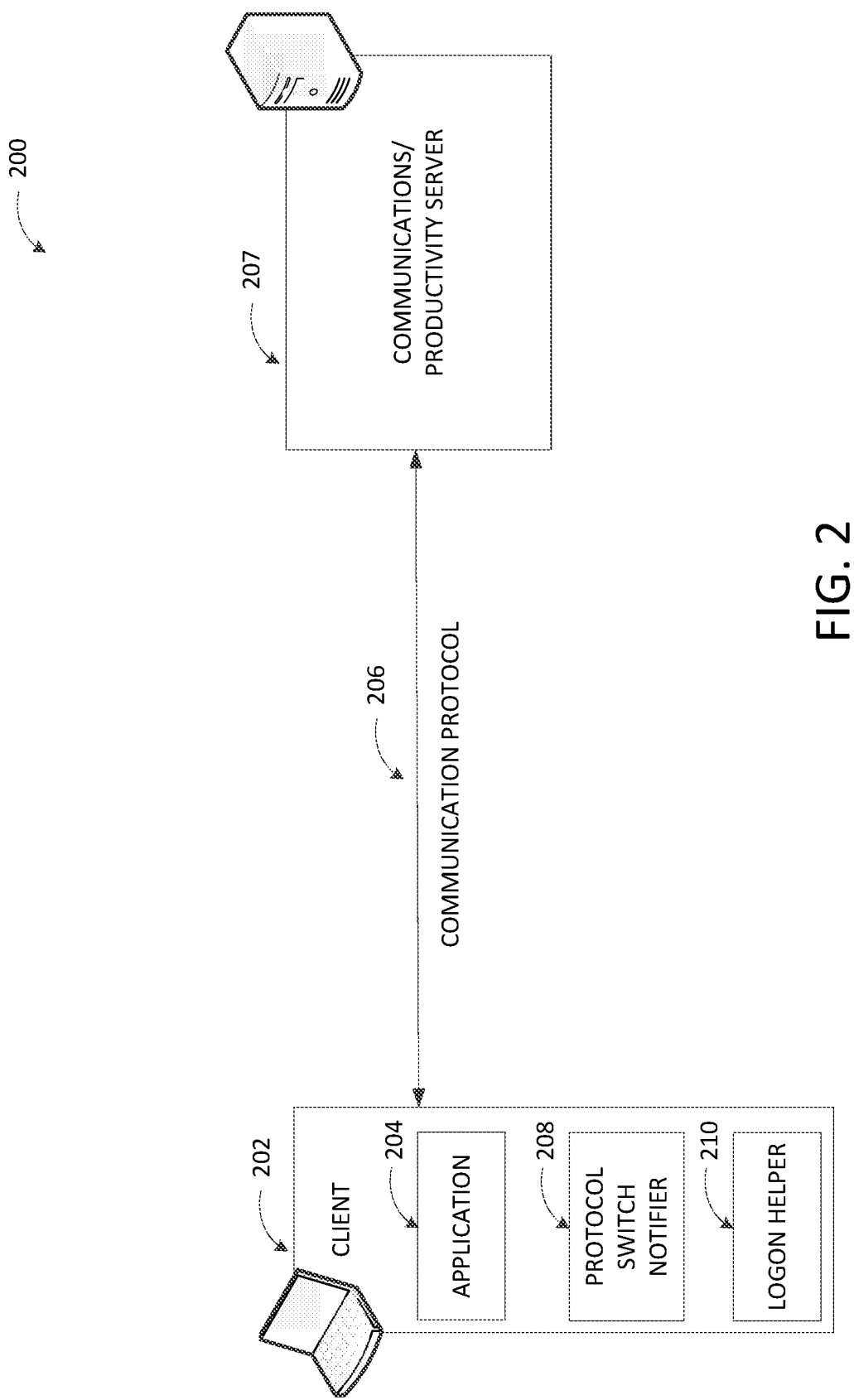
FIG. 2 illustrates an exemplary system of data exchange between a client and a server employing messaging-over-HTTP protocol, according to an example embodiment.

FIG. 2 illustrates an example data exchange between a client and a server employing messaging-over-HTTP protocol, according to some embodiments described herein. In alternative embodiments, a protocol other than the messaging-over-RPC protocol may be employed between the client and server for data exchange. One of skill in the art will appreciate that any communication protocol may be employed by the embodiments disclosed herein.

As illustrated in system 200, a client 202 may execute an application 204, such as a productivity application, a communication application, or other type of application, such as an email application, contacts application, a calendar management application, etc., on the client 202. The client 202 may communicate with a server 207 over a network (not shown) to retrieve data associated with the application 204 such as, for example, email data. One of skill in the art will appreciate that the type of data being accessed over the network may vary depending on the type of application 204 executing on the client 202.

In system 200, a connection may be established between the client 202 and the server 207 in order to enable data, messages, and/or information to be exchanged with the between the client 202 and server 207. The client 202, via application 204 or via another component, may initiate a connection with the server 207 via a network and may request data from the server 207. The server 207 may accept the request, process the request, and return the requested information to the client 202.

In an example embodiment, the HTTP protocol may be employed to facilitate communication, authentication, and exchange of data between the client 202 and the server 207. The HTTP protocol defines methods, commands, requests, and/or messages, which may be used to indicate a desired action to be performed by the server to retrieve requested information for client 202. For example, the client 202 may issue a GET request to retrieve data from the server 207. Another example request employed in HTTP may be a POST request which may be issued by the client to instruct the server 207 store data transmitted by the client. While specific HTTP methods are described herein, one of skill in the art will appreciate that other HTTP methods, or commands defined by communications protocols other than the HTTP protocol may be employed with the embodiments disclosed herein.

In an example embodiment, the client 202 may incorporate a communication protocol 206 over HTTP in order to facilitate communication of data related to the application 204 (or other data) between the client 202 and the server 207 via a network. For example, in embodiments the messaging-over-HTTP protocol may enable the client 202 to send a request to the server 207 over an HTTP connection and to receive a response from the server 207 over the same HTTP connection.

In another example embodiment, the client 202 may incorporate another communication protocol 206, such as the RPC protocol, in order to facilitate the communication of data associated with the application 204 executed between the client 202 and the server 207. The RPC protocol may enable the client 202 to send a request to the server 207 over an RPC connection and to receive a server response over the same RPC connection.

However, in the embodiments disclosed herein, the client 202 may include a protocol switch notifier (PSN) 208 and a logon helper (LH) 210. The PSN 208 is an agent on the client 202 that may send a notification or advertises that the client supports a change in protocol to the server 207 after a connection has been established between the client 202 and the server 207. The server 207 based on this advertisement may determine if the server 207 wants to switch protocols. If the server decides that a switch in protocol is advantageous or desirable, the server 207 may send data (i.e. settings, act.) for the new protocol to the client 202. If the server decides that a switch in protocol is not advantageous or not desirable, the server 207 may not send any data for implementing the new protocol and continues to communicate with client 202 via the current protocol. Accordingly, in these embodiments, the server 207 determines if a new protocol should be utilized for communication between the server 207 and the client 202.

In alternative embodiments, the PSN 208 is an agent on the client 202 that may determine if a change in protocol has been requested by the server 207 after a connection has been established between the client 202 and the server 207. In these embodiments, if a change in protocol is not detected by PSN 208, as long as there is a connection between the client 202 and the server 207, the PSN 208 may continue to monitor for requests from the server 207 to change the protocol. In these embodiments, if a change in protocol is detected by the PSN 208, the PSN 208 may notify the LH 210 of the requested change and may send a notice to the server 207 that the client 202 is capable of switching protocols. The server 207, in response to the notice, may send data to the client 202 for implementing the new protocol. Accordingly, in some embodiments, the client 202 may determine if a new protocol should be utilized for communication between the server 207 and the client 202.

If data for implementing the new protocol is not received from the server 207 as determined by the PSN 208, as long as there is a connection between the client 202 and the server 207, the PSN 208 may continue to monitor for the data from the server 207 to change the protocol. In embodiments, the notice of the capability to change protocols may be included in a header, a message, or another payload. For example, in an embodiment where the email client is Microsoft Outlook® developed by the MICROSOFT® Corporation of Redmond, Wash., the notice of the capability to switch to a different protocol may be included in the protocol section of the XML Payload of an Autodiscover response sent to the server 207. However, in other embodiments, the notice may be transmitted in another fashion, such as for example, in a standalone message. If a data for implementing the new protocol is detected by the PSN 208, the PSN 208 notifies the LH 210 of the requested change.

The LH 210 may be a process, application, or component that facilitates a connection. In embodiments, the LH 210 may be a finite state machine that controls the connection process or processes of a client 202.

In embodiments, LH 210 can dynamically switch from a current protocol (e.g., a communication protocol presently used to facilitate communications) to a new protocol upon server request. In embodiments, the LH 210 organizes the connection process differently when the LH receives notice of a server request to switch protocols from the PSN 208. First, the client 202 during the connection process similarly to the previously utilized client initializes followed by an initialization of connection information. Unlike the previously utilized client, the client 202 next initializes the store of user information and then checks to see if any new protocol data (or different from the currently utilized protocol) has been received. If new protocol data has been received the connection process moves on to determine if the protocol data is valid. If no protocol data is received, the LH proceeds to initialize store of current protocol data. If the LH 210 did not receive notice from the PSN of a request to switch protocols, the LH during the connection process would skip the check for new protocol data operation and go directly from initialize store of user information to initialize store of current protocol data. The notice from the PSN triggers the LH to require a check for new protocol data.

The new protocol data is valid if the data meets the client's specifications or, in other words, if the client or an application executing on the client is capable of supporting the new protocol, thereby allowing the client to utilize the new protocol. The new protocol data is invalid if the data does not meet the client's specification meaning that the client cannot utilize the new protocol from the data received. If the client 202 determines that the new protocol data is valid, the client initializes the store of the new protocol data and finds this existing stored protocol data. If the client 202 determines that the new protocol data is invalid, the client 202 initializes the store of the currently utilized protocol data, does not store the data for the new protocol, and then finds the existing stored protocol data. The client 202, similarly to the previously utilized client, then stores the confirmation based on the stored protocol data and begins a connection attempt utilizing known connection procedures. As discussed above, the connection attempt of connection process is sent to the terminal for transmission to the server 207.

In some embodiments, the LH cannot complete the switch in protocol until the client is restarted. In alternative embodiments, the LH completes the switch in protocol without requiring the client to restart. The client 202 does not need to be deleted and a new account created to specify the new protocol to switch from a current protocol to a new protocol. Accordingly, the client does not require the server to redownload the data for the client anew during a switch in protocols. Additionally, the only disruption in data exchange is limited to the switch in protocol, which may or may not require a client restart. Further, the switch in protocol requires either no action by the end user or requires a very limited action of restarting the client by the end user.

Figure 3:
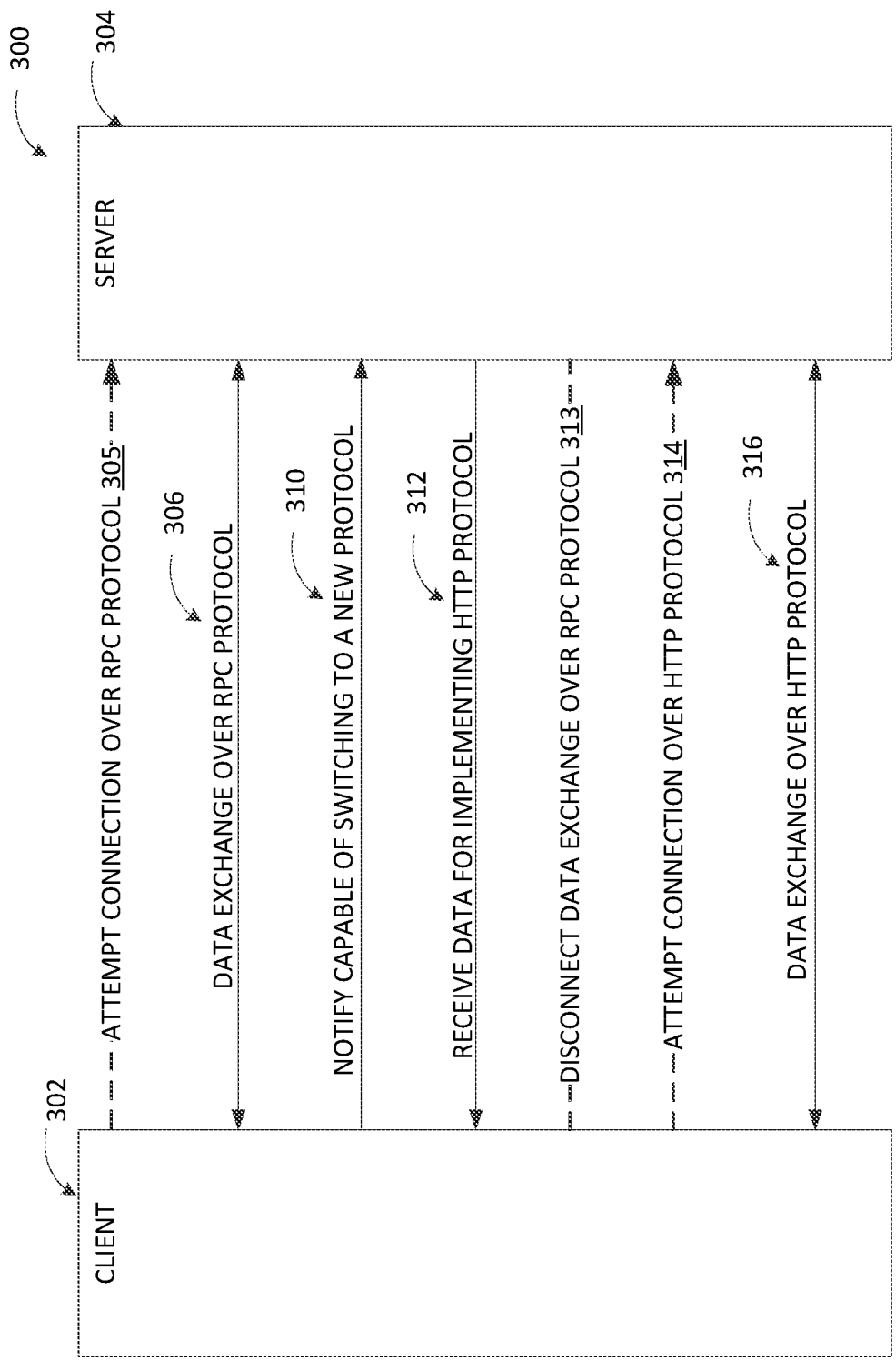
FIG. 3 illustrates an exemplary message exchange between a client and a server to switch a protocol according to an example embodiment.

Referring now to FIG. 3, an example system 300, according to an example embodiment. FIG. 3 illustrates an example embodiment of data exchanged between a client 302 and a server 304 employing a communication protocol. In the illustrated embodiment, the RPC protocol is illustrated. However, other communications protocols may be employed without departing from the scope of the present disclosure. In the illustrated embodiment, an initial communication protocol, e.g., the RPC protocol 306, is switched to the second communication protocol, e.g., HTTP protocol 316.

In the illustrated embodiment, the client 302 attempts to connect the server 304 utilizing the RPC protocol 305. If a connection is made, the client and server employ a RPC protocol 306 to communicate data. As previously described in conjunction with FIG. 2, the client 302, once a connection is established, may utilize standardized RPC requests in order to communicate with the server 304. However, one of skill in the art will appreciate that other communication protocols may be employed to facilitate communication between a client and a server. After establishing communications using the RPC protocol 306, the client 302 sends a message 310 that informs the server 304 that the client 302 is capable of, or otherwise configured to, facilitate a switch in protocol. As discussed above, the client 302 may use a process, such as but not limited to PSN 208, to send the notification or notice (or advertising) that the client 302 is capable of switching to a new protocol (i.e., supports a new protocol).

The server 304, in response to receiving the client notification 310 that the client is capable of switching protocols, determines if a switch in protocol is desired. If a switch in protocol is desired, the server 304 sends data 312 for implementing a second or new protocol, such as, for example, the HTTP protocol. The data may include set-up information, settings, authentication information, and/or any other data needed for a client to implement and/or use the new protocol (e.g., settings information for the HTTP protocol in the illustrated example). In response to the data or the notice that the server 304 has requested a new protocol (the HTTP protocol in the illustrated example), the client reorganizes the connection process, for example, by employing the LH 210, to check for new protocol data and to determine the validity of the new protocol data before configuring the connection with the server 302. In embodiments, the PSN of the client 302 may send a notice to another process, such as the LH 210, that the server has requested send data for changing communication protocols for reorganizing the connection process.

In embodiments, the client 302 may not perform the new connection process until after the current data exchange over the RPC protocol is completed and/or disconnected 313. In some embodiments, the client 302 does not perform the new the connection process until the application is restarted. In other embodiments, the current connection is immediately disconnected 313, and the new connection using the new communication protocol (e.g., HTTP in the illustrated example) is established between the client 302 and the server 304.

In the embodiment shown in FIG. 3, the client 302 determines that the protocol data is valid (e.g., the settings for implementing the new protocol is supported by the client) and establishes 314 a connection utilizing the newly requested protocol, which causes the client to connect to the server employing the HTTP protocol 316 in the illustrated example. Alternatively, if the client 302 determines that the data for implanting the new protocol is invalid (e.g., the settings are unsupported by the client) during the connection process, the client 302 establishes a connection using the previously utilized protocol, e.g., the RPC protocol 306 in the illustrated embodiment. In an alternate embodiment, the determination of whether the request for a new protocol is valid or not, may be made prior to disconnecting the initial connection. In such embodiments, if the request is invalid, the initial connection may not be disconnected. While the embodiments described with respect to FIG. 3 describe specific protocols (e.g., RPC and HTTP), one of skill in the art will appreciate that the described embodiments may operate regardless of the type protocols employed to facilitate communication between a client and a server.

Figure 4:
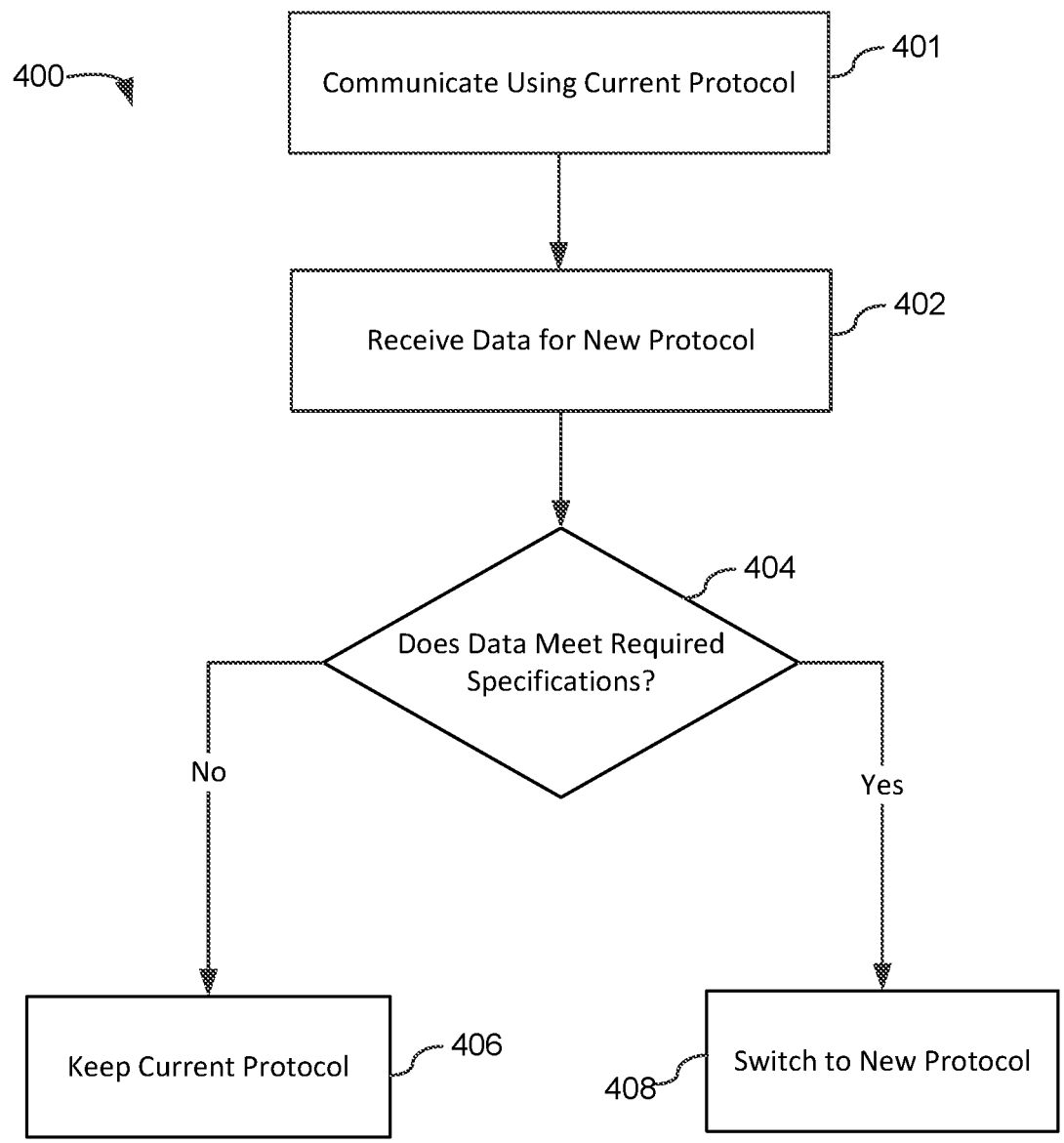
FIG. 4 illustrates an example flow diagram of a method for switching protocols, according to an example embodiment.

Referring now to FIG. 4, an example method 400 for switching a client from a current protocol to a new protocol is illustrated, according to an example embodiment. The method 400 may be implemented on a client or an application executing on a client. Further, the client performing method 400 may be configured to switch protocols without requiring the creation of a new account. In some embodiments, the client or application performing method 400 may be configured to dynamically switch protocols or switch protocols in real-time. In embodiments, a client executing method 400 may include, but is not limited to, a desktop computing device, a personal computer, a tablet, mobile phone, a smartphone, an electronic whiteboard, and other similar client devices.

In the embodiment shown, method 400 includes a communicating operation 401. In embodiments, during communicating operation 401 communicates with a server using a current protocol (as also referred to as a first protocol or initial protocol). The client and server exchange data utilizing the current protocol. In some embodiments, the client communicates with the server during operation 401 may be executing an email application, a social networking application, a collaboration application, an enterprise management application, a messaging application, a word processing application, a spreadsheet application, a database application, a presentation application, a contacts application, and/or a calendaring application.

Next, method 400 flow continues to receiving operation 402. At receiving operation 402, the device or application performing the method 400 receives data from the server for implementing a new protocol (also referred to herein as a second protocol). The data may include set-up information, settings, authentication information, and/or any other data needed for a client to implement and/or use the new protocol. The first and the second protocols are different from each other. In embodiments, the data received at operation 402 may be received in response to the client sending a notification to the server that the client is capable of switching protocols. In some embodiments, the current protocol is an RPC protocol and the new protocol is an HTTP protocol. In other embodiments, the current protocol is an HTTP protocol and the new protocol is an RPC protocol. One of skill in the art will appreciate that many different types of protocols may be employed without departing from the spirit of the present disclosure.

Flow continues to decision operation 404. At decision operation 404, the device or application performing the method 400 may compare the data for implementing the new protocol to specifications of the client for switching to the new protocol. Stated another way, at decision operation 404, the device or application performing the method 400 analyzes the specification for implementing the new protocol to determine if they are supported by the device or application. The specifications may include a list of data, authentication information, and/or any other data required by the client for implementing a new protocol. In embodiments, the specifications may be a listing of capabilities that the client or application supports (e.g., a list of protocols supported by the client). In such embodiments, comparing the data may include determining if the protocol identified by the data received at operation 402 is supported by the client or application. If the data for the new protocol does not meet the specifications (e.g., the client or application does not support the new protocol, cannot implement the new protocol, or the request is otherwise invalid or inoperable), a determination is made that the data for implementing the new protocol is invalid and flow branches No to operation 406 that reestablishes a communication connection with the server using the current or first protocol. If the data for implementing the new protocol meets the specifications (e.g., is supported by the client, contains the necessary information, can be implementing by the client, is a valid request, etc.) based on the comparison, a determination that the data for the new protocol is valid is made and flow branches Yes to switching operation 408 that reestablishes a communication connection with the server using the new or second protocol. In other embodiments, at decision operation 404, the device or application performing the method 400 analyzes the data for implementing the new protocol to determine if the data is sufficient for allowing the client to switch to the new protocol.

Before the performance of the decision operation 404 and after the performance of the receive operation 402, the connection between the server and the client is disconnected. In some embodiments, the connection may be disconnected by the server. In other embodiments, the connection may be disconnected by the client or an application executing on the client. In other embodiments, the disconnection is caused by the network. In some embodiments, the client must be restarted before the performance of the decision operation 404 and after the performance of receives operation 402. In alternative embodiments, the client does not have to be restarted before the decision operation 604 is performed and after the receive operation 602 is performed.

Figure 5:
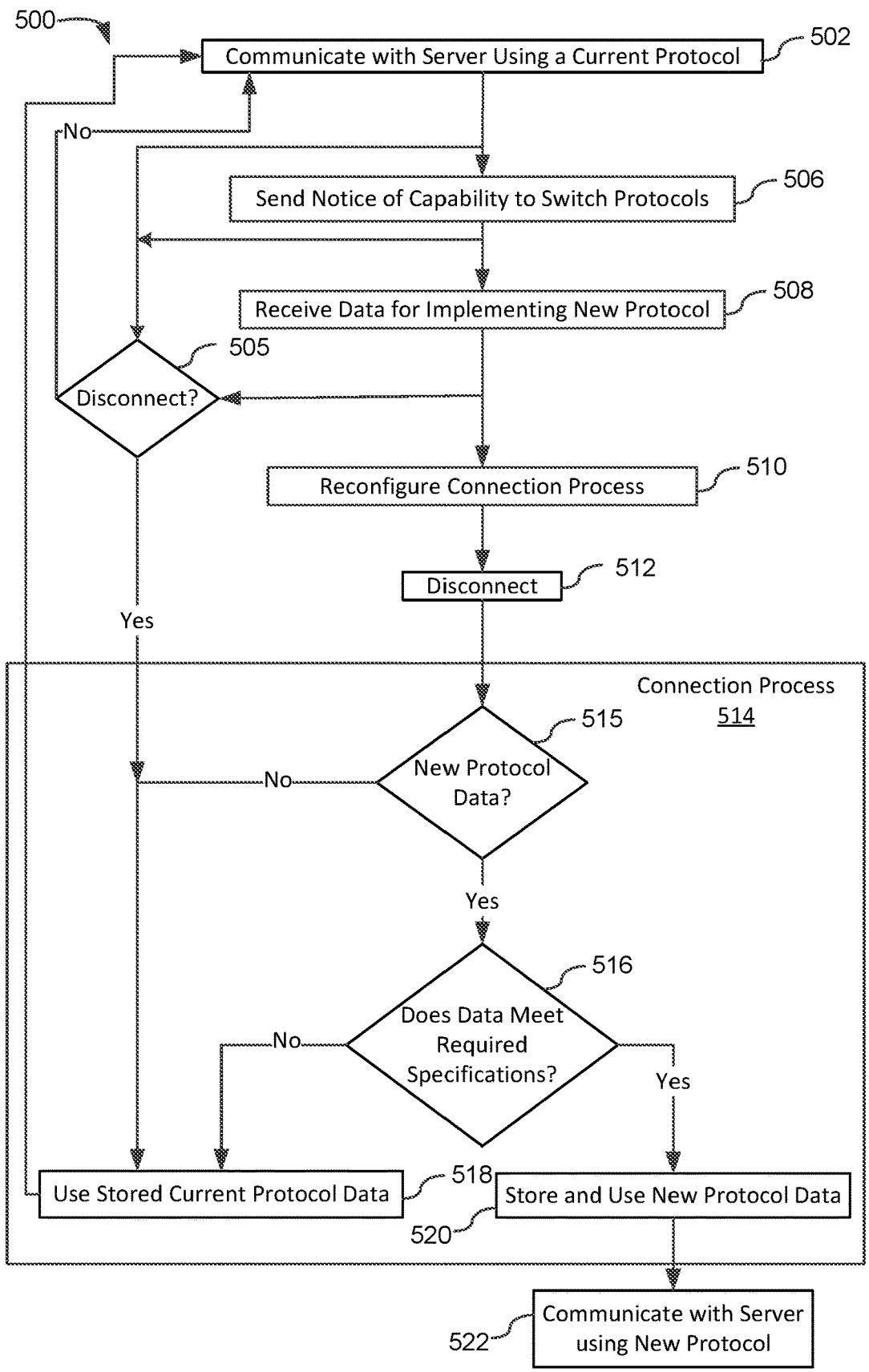
FIG. 5 illustrate an example flow diagram of a method for switching protocols, according to an example embodiment.

Referring now to FIG. 5, a flowchart of an example method 500 performed to switch a client from a current protocol to a new protocol is illustrated, according to an example embodiment. The current protocol is the protocol the currently utilized for communications between a client and a server. The new protocol is any protocol that is different from the current protocol (e.g., a protocol not currently used for communications between the client and server). Additionally, the client or application executing method 500 may be configured with the capability to switch to a different protocol. In some embodiments, the client or application executing method 500 may be configured with the capability to dynamically switch to a different protocol or to switch to a different protocol in real-time.

As illustrated, method 500 includes a communication operation 502. During communication operation 502, a client or application communicates with the server utilizing a current protocol. Accordingly, the client and the sever exchange data utilizing the current protocol.

Flow proceeds to sending operation 506. At operation 506, the client or application performing the method 500 sends a notice or advertises to the server that the client is capable of (or supports) switching to a different protocol. Operation 506 may be performed during the performance of operation 502. In some embodiments, the client utilizes an agent or a Protocol Switch Notifier (PSN) to send the notice. For example, the PSN may send the notice that the client supports a different protocol in the protocol section of the XML Payload of an Autodiscover message to the server.

The server receives this notice and then may determine if the server wants to switch to the new protocol. If the server decides to switch to the new protocol, the server may send data for implementing the new or different protocol to the client. If the server determines not to utilize a new protocol, the server may not send any data to the client and the client and the server may continue to utilize the current communication protocol to exchange data over a network. Accordingly, the server may decide if a new protocol should be utilized. In alternative embodiments, the client determines if the new protocol should be utilized to communicate and/or exchange data between the client and server.

Flow continues to operation 508 where data is received for implementing the new protocol. In embodiments, the data received at operation 508 may include set-up information, settings, authentication information, and/or any other data needed for a client to implement and/or use the new protocol. In some embodiments, the client utilizes an agent that monitors for the data from the server to switch to a new protocol. In embodiments, the PSN of the client during operation 508 monitors for the data from the server. Operation 508 may be performed during the performance of operation 502.

At decision operation 505, the client or application performing the method 500 determines if a communication connection using the current or first protocol has become disconnected. A disconnection between the client and the sever may happen for varying reasons, such as the loss of connectivity and etc. In some embodiments, the disconnection is caused by the server. In other embodiments, the disconnection is caused by the client. In further embodiments, the disconnection is caused by the network. If a determination is made that the communication connection is still connected (or not disconnected), the flow branches No to operation 502 and communication is continued or maintained using the current or first protocol. If a determination is made that the communication connection is disconnected at any point during method 500 before the performance of operation 510, flow branches Yes to connection operation 514 that reestablish a communication connection with the server using the current or first protocol. The connection operation 514 reestablishes the communication connection with the server by performing operation 518.

Flow continues from operation 508 to operation 510. At operation 510, state data for the client or application (e.g., state data maintained by LH 210) may be reconfigured to indicate that data for a new protocol should be looked and/or evaluated for to connect to and communicate with the server.

Flow continues to disconnecting operation 512. Disconnecting operation 512 may not be different from a disconnection that is detected during operation 505 other than the location of the disconnection within method 500. During disconnecting operation 512 the client or application is disconnected from the server (e.g., disables communications with the server). In some embodiments, the disconnection is caused by the network, such as loss of connectivity. Accordingly, the server and the client cannot exchange data after the performance of operation 512. In embodiments, the client may initiate the disconnection 512 in response to a received request or in response to received data for implementing a new protocol. The performance of the disconnecting operation 512 ends the performance of operation 502. The disconnection may be the result of sever action or client action. In some embodiments, the disconnection is caused by the restart of the client. In some embodiments, the disconnection happens and then the client is restarted. In other embodiments, the client is running during the entire performance of the method 500 and is never restarted. While operations 510 and 512 are shown in a specific order, these operations may be performed in any order, may overlap in performance, or may be performed simultaneously.

Flow continues to connecting operation 514. At connecting operation 514, (also referred to as connection process 514), the client or application performing the method 500 performs a process for connecting the client to the server. In other words, the client or device executing the client during connecting operation 514 reestablishing a communication connection with the server using a protocol. The connection process 514 is performed after any disconnection between the server and the client. The connecting process 514 comprises a new protocol data decision operation 515, a specifications decision operation 516, a finding and using current protocol data operation 518, and a storing, finding, and using new protocol data operation 520.

At decision operation 515, the client or application performing the method 500 checks to determine if the client has received data for implementing the new protocol. If the client determines during operation 515 that it has received new protocol data, flow branches Yes to specifications decision operation 516. If the client determines during operation 515 that it has not received any new data for implementing the protocol, flow branch No to operation 518.

At decision operation 516, the client or application performing the method 500 compares the data for implementing the new protocol to the specifications required by the client for utilizing the new protocol. The client determines whether to use the new or current protocol based on this comparison. The specifications may include a list of data, authentication information, and/or any other data required by the client for implementing a new protocol. If the client or application determines that the data meets its specifications (e.g., is supported by the client, contains the necessary information or data to establish the connection, can be performed by the client, is a valid request, etc.), flow branch Yes to operation 520. If the client or application determines that the data for the new protocol does not meet the client's specification (e.g., the client or application does not support the new protocol, cannot implement the new protocol, or the request is otherwise invalid or inoperable), flow branches No to operation 518.

At the storing, finding, and using data for implementing a new protocol operation 520, the client or application performing the method 500 finds and uses the newly stored data to reestablish a communication connection with the server. Once a connection is made, the connection process 514 ends and the client performs operation 522.

Flow continues to connecting operation 522. At communicating new protocol operation 522, the client or application performing the method 500 communicates with the server utilizing the new protocol. Accordingly, the client and the sever exchange data utilizing the new protocol.

At operation 518, the client or application performing the method 500 finds and uses previously stored data for implementing the current protocol to reestablish the communication connection with the server. Once a connection is made, the connection process 514 ends and operation 502 is performed.

Thus, methods 400 and 500 do not require the client to delete and create a new account in order to use the new protocol. In other words, the methods 400 and 500 may be sued to dynamically switch from a current protocol to a new protocol. Accordingly, methods 400 and 500 do not require the server to download the data for the client anew after a switch in protocols. Additionally, the only disruption in data exchange during methods 400 and 500 is limited to the switch in protocol, which may or may not require a client restart. Further, the switch in protocol during methods 400 and 500 require either no action by the end user or a very limited action of a restart of the client by the end user.

Figure 6:
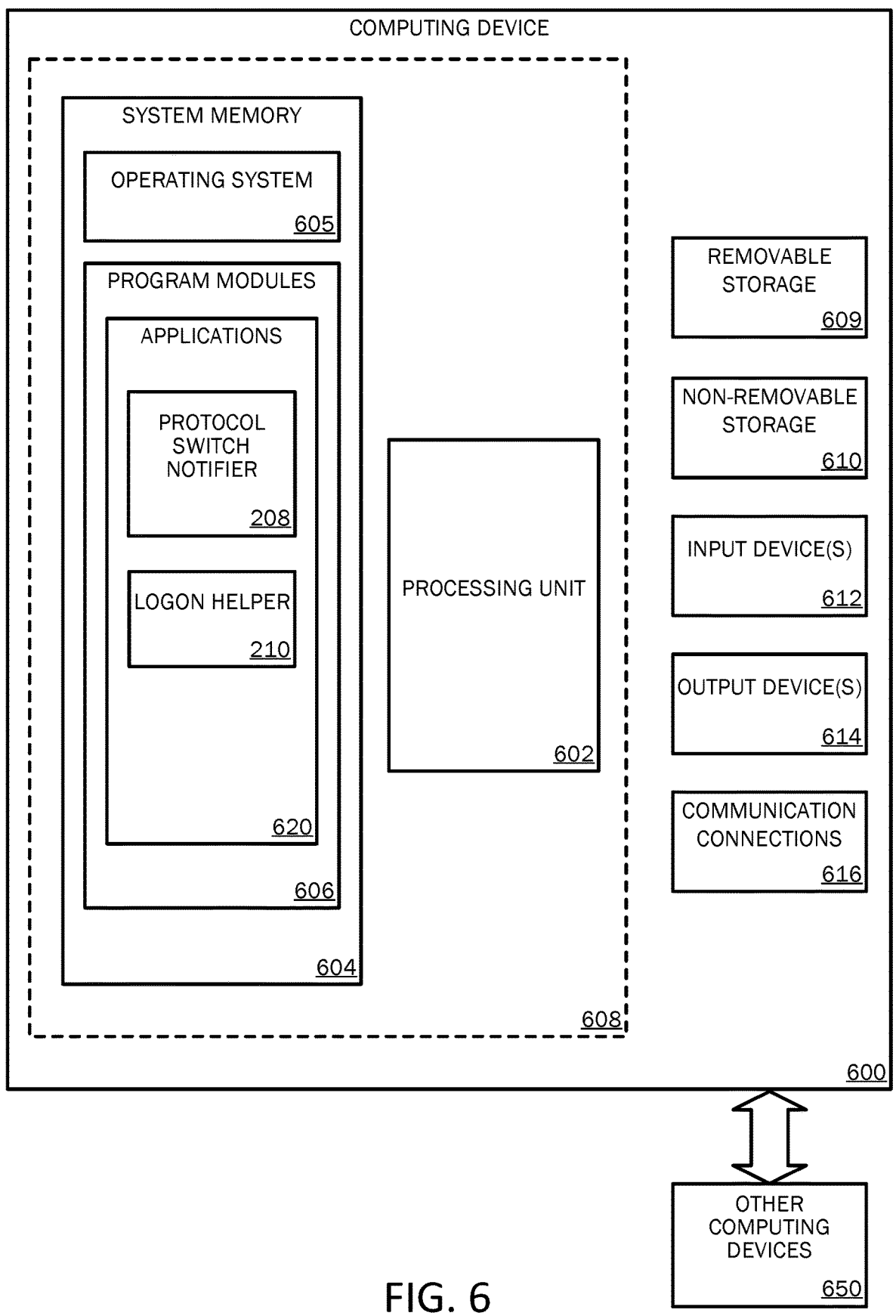
FIG. 6 is a block diagram illustrating example physical components of a computing device with which embodiments of the disclosure may be practiced.
Figure 7A:
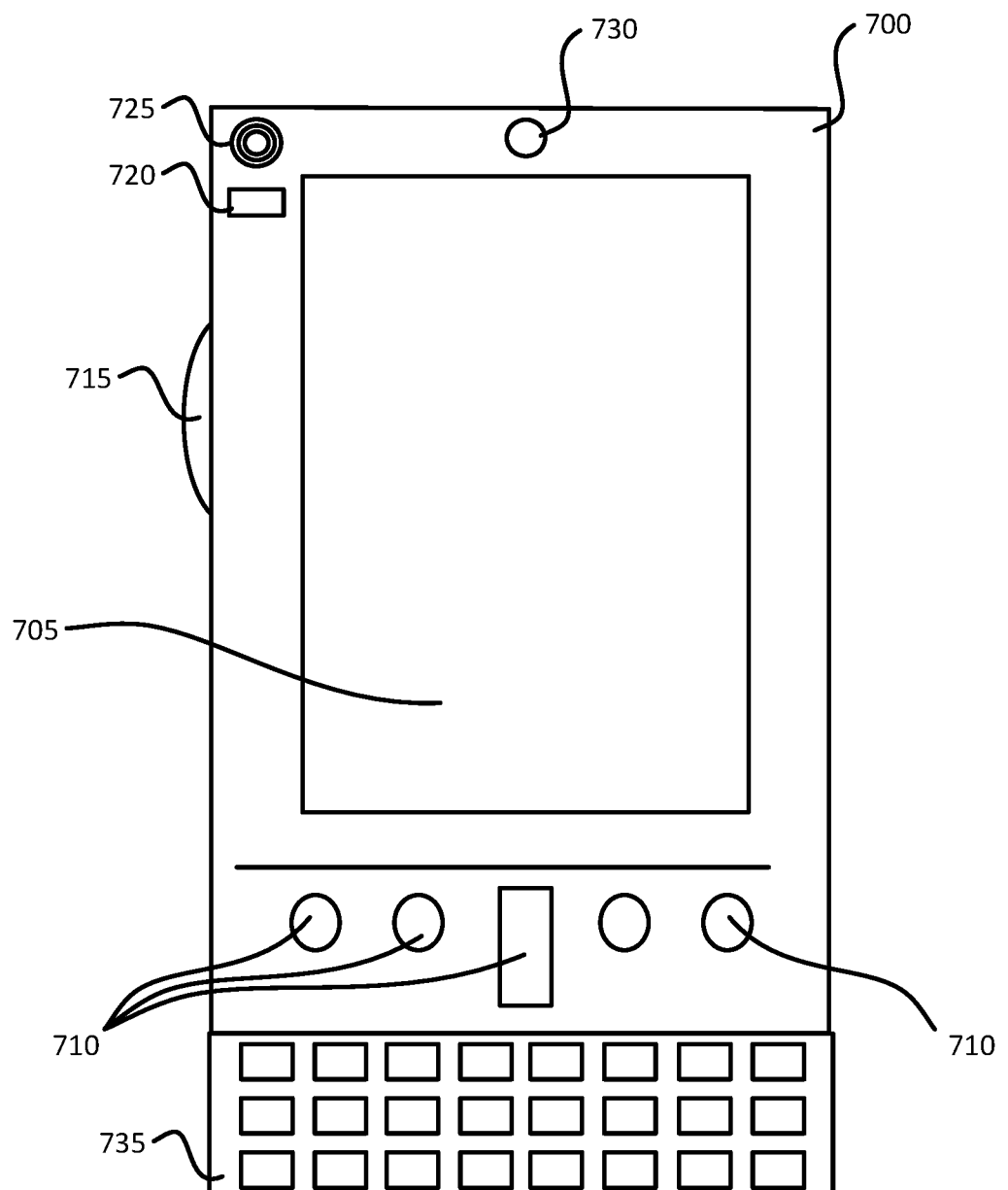
FIGS. 7A and 7B are simplified block diagrams of a mobile computing device with which embodiments of the present disclosure may be practiced.
Figure 7B:
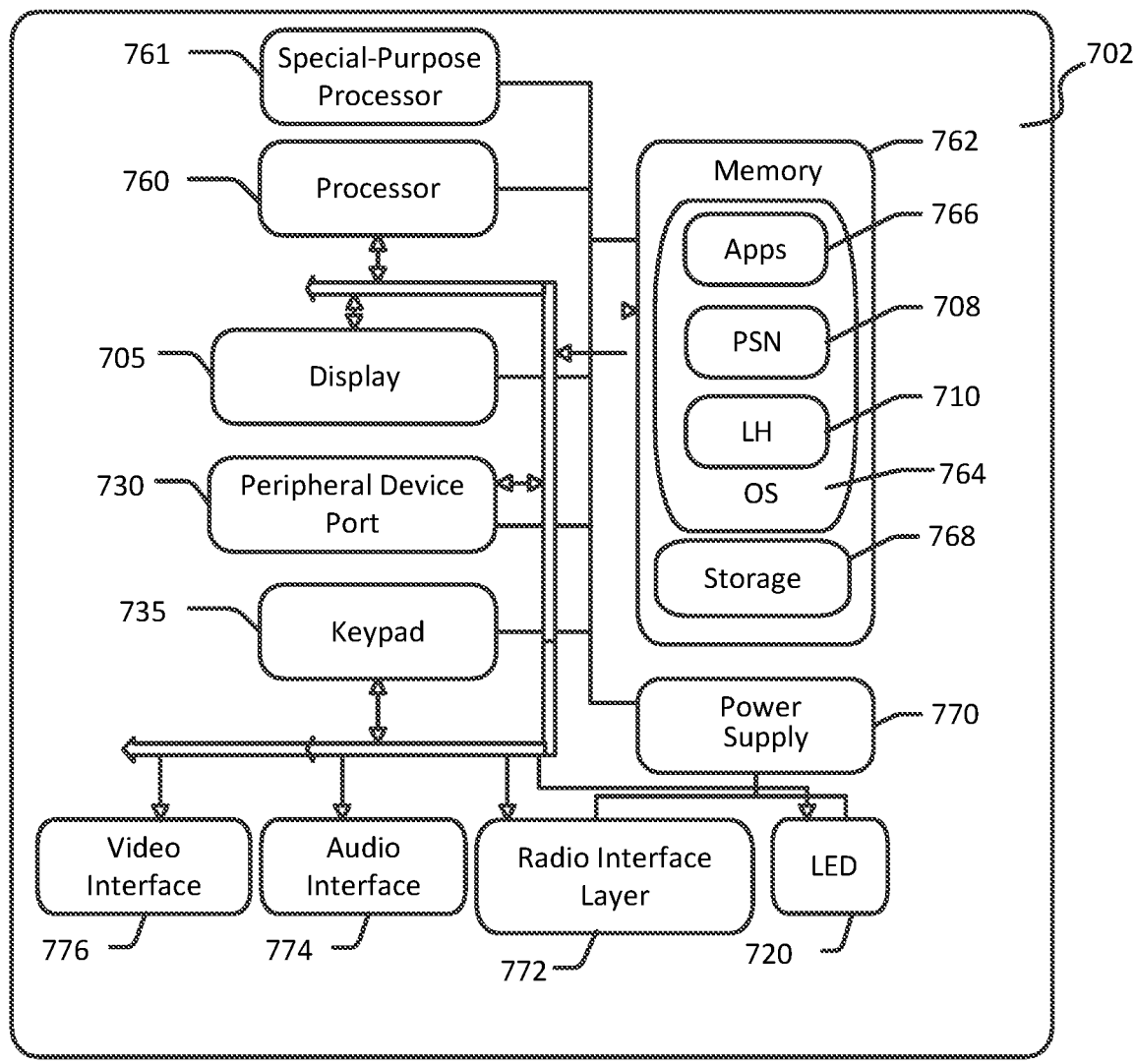
Figure 8:
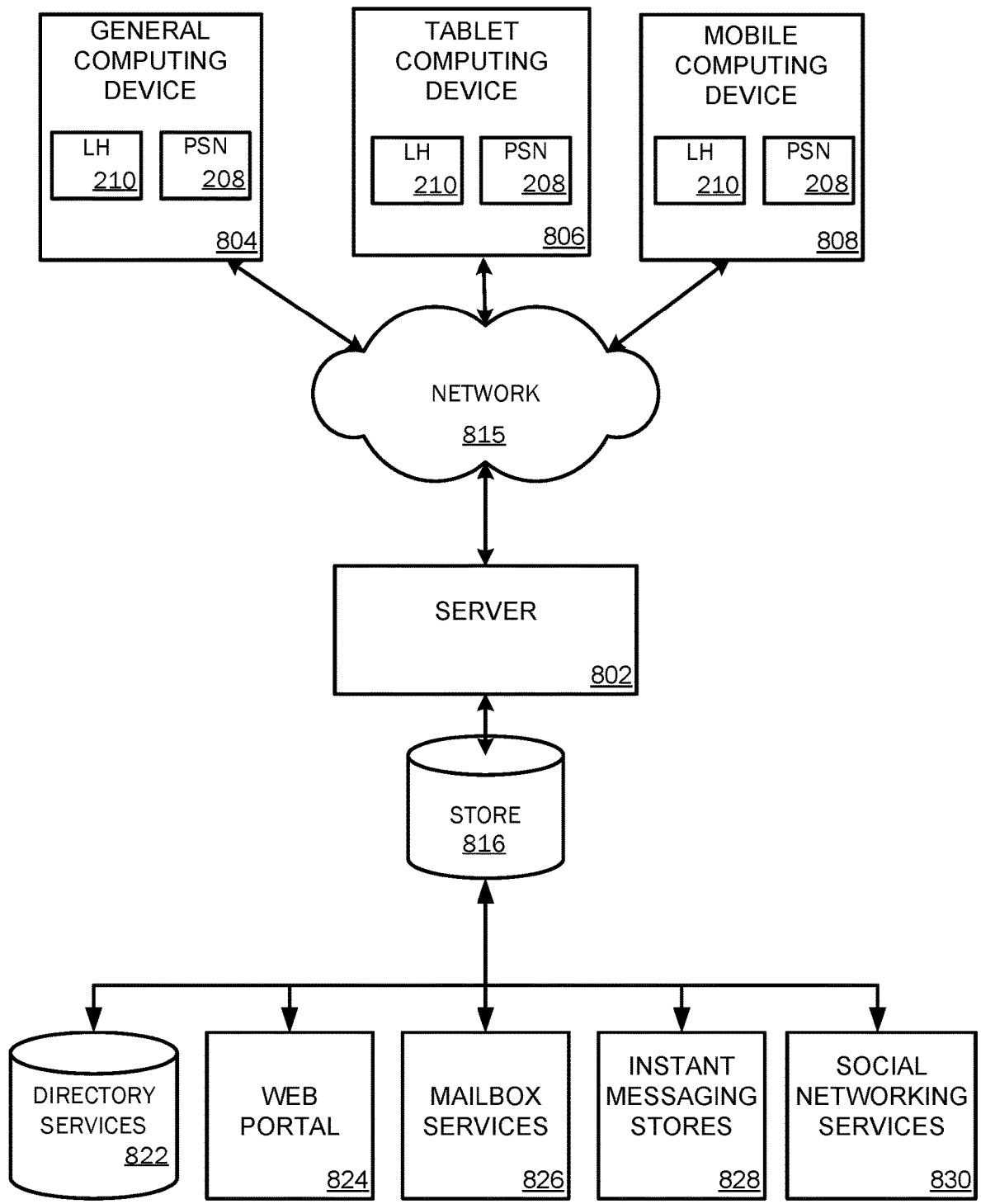
FIG. 8 is a simplified block diagram of a distributed computing system in which embodiments of the present disclosure may be practiced.

FIGS. 6-8 and the associated descriptions provide a discussion of a variety of operating environments in which embodiments of the disclosure may be practiced. However, the devices and systems illustrated and discussed with respect to FIGS. 6-8 are for purposes of example and illustration and are not limiting of a vast number of computing device configurations that may be utilized for practicing embodiments of the disclosure, described herein.

FIG. 6 is a block diagram illustrating physical components (i.e., hardware) of a computing device 600 with which embodiments of the disclosure may be practiced. The computing device components described below may be suitable to act as the computing devices described above for executing the client 102 of FIG. 1, client 202 of FIG. 2, and client 502 of FIG. 5. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as a switch in client protocol as discussed above in connection with FIGS. 1-5, and in particular the PSN 208 and LH 210 described in connection with FIGS. 2-4. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., PSN 208 and LH 210) may perform processes including, but not limited to, email applications, as described herein. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a smart watch, wearable computer, a tablet personal computer, a laptop computer, and the like, with which embodiments of the disclosure may be practiced. With reference to FIG. 7A, one embodiment of a mobile computing device 700 for implementing the embodiments is illustrated. In a basic configuration, the mobile computing device 700 is a hand-held computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the capability to switch protocols (and/or optionally client 202, PSN 208 or 708, and LH 210 or 710) described herein. In some analogous systems, an inverse process can be performed via system 702, in which the system acts as a remote device 120 for decoding a bitstream generated using a universal screen content codec.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760, special-purpose processor 761, and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system for processing data received at a computing system from a remote source, such as a computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830.

The PSN 208 and LH 210 may switch a client protocol based on communication with a server 802 over the web, e.g., through a network 815. By way of example, the client computing device may be implemented as the communication service device 84 or productivity service device 86 and embodied in a personal computer 804, a tablet computing device 806 and/or a mobile computing device 808 (e.g., a smart phone). Any of these embodiments of the computing devices 84, 86, 800, 900, 802, 804, 806, 808 may obtain content from the store 816, in addition to receiving graphical data useable to be either pre-processed at a graphic-originating system, or post-processed at a receiving computing system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Additionally, while the embodiments may be described in the general context of program modules that execute in conjunction with an application program that runs on an operating system on a computing device, those skilled in the art will recognize that aspects may also be implemented in combination with other program modules. In further embodiments, the embodiments disclosed herein may be implemented in hardware.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

What is claimed is:

1. A method for switching communication protocols between a client and a server while a client application is executing at the client, the method comprising:
    determining a first communication protocol associated with an existing user account configured at the client application;
    establishing, by the client application, a communication connection with the server using the first communication protocol;
    communicating with the server using the first communication protocol in the established communication connection by the client application; and
    dynamically switching between the first communication protocol and a second communication protocol by:
        sending a notice to the server using the first communication protocol, the notice indicating that the client is capable of switching communication protocols and that the client supports the second communication protocol;
        receiving data from the server for implementing the second communication protocol after the notice is sent to the server using the first communication protocol, wherein the first communication protocol and the second communication protocol are different types of communication protocols; and
        reestablishing a communication connection with the server using the second communication protocol while continuing to execute the client application configured with the existing user account.

2. The method of claim 1, further comprising:
    storing data for the second communication protocol; and
    using the stored data to establish the communication connection with the second communication protocol.

3. The method of claim 1, wherein the first communication protocol is a remote procedure call (RPC) protocol and the second communication protocol is a hypertext transfer (HTTP) protocol.

4. The method of claim 1, wherein the client comprises at least one of:
    a mobile telephone;
    a smart phone;
    a smart watch;
    a wearable computer;
    a tablet;
    a personal computer;
    a desktop computer; and
    a laptop computer.

5. The method of claim 1, wherein the client application is at least one of:
    an email application;
    a social networking application;
    a collaboration application;
    an enterprise management application;
    a messaging application;
    a word processing application;
    a spreadsheet application;
    a database application;
    a presentation application;
    a contacts application; and
    a calendaring application.

6. The method of claim 1, further comprising:
    determining, by the client, that the second communication protocol is to be utilized for communication between the server and the client.

7. The method of claim 1, wherein reestablishing a communication connection with the server while continuing to execute the client application includes initiating a new communication process using the second communication protocol after completing a data exchange with the server using the first communication protocol.

8. The method of claim 7, wherein the completion of the data exchange occurs after a determination to dynamically switch from the first communication protocol to the second communication protocol.

9. The method of claim 1, further comprising:
    providing, by a first process of the client, a notification to a second process of the client indicating that the second communication protocol is to be utilized for communication between the server and the client.

10. The method of claim 9, where the second process of the client controls the reestablishment of the communication connection with the server.

11. A system comprising:
    a client for data exchange with a server executed at least in part by a computing device, the computing device comprising:
        at least one processor; and
        a memory for containing computer-executable instructions that, when executed by the at least one processor, perform a method comprising:
            determining a first protocol associated with an existing user account configured at a client application;
            establishing, by the client application, a communication connection with the server using the first protocol by the client, wherein establishing the communication connection with the server using the first protocol by the client comprises executing the first client application;
            dynamically switching between the first protocol and a second protocol by:
                sending a notice to the server using the first protocol, the notice indicating that the client supports the second protocol;
                receiving data from the server for implementing the second protocol after the notice is sent to the server using the first protocol, wherein the first protocol and the second protocol are different types of protocols; and
                switching from using the first protocol to using the second protocol when reestablishing the communication connection with the server using the second protocol, wherein reestablishing the communication connection with the server comprises resuming execution of the first client application configured with the existing user account.

12. The system of claim 11, wherein the data exchange is for at least one of:
    an email application;
    a social networking application;
    a collaboration application;
    an enterprise management application;
    a messaging application;

a word processing application;
a spreadsheet application;
a database application;
a presentation application;
a contacts application; and
a calendaring application.

13. The system of claim 11, wherein the first protocol is a hypertext transfer (HTTP) protocol and the second protocol is a remote procedure call (RPC) protocol.

14. The system of claim 11, wherein the switching from the first protocol to the second protocol further comprises:
storing the data for the second protocol; and
using the stored data to reestablish the communication connection with the second protocol.

15. The system of claim 11, wherein the client comprises at least one of:
a mobile telephone;
a smart phone;
a smart watch;
a wearable computer;
a tablet;
a personal computer;
a desktop computer; and
a laptop computer.

16. The system of claim 11, wherein the method further comprises:
changing a connection process of the client to include at least a check for new protocol data and a data validity check based on the receiving of the data from the server.

17. The system of claim 11, wherein switching from using the first protocol to using the second protocol when reestablishing the communication connection with the server includes initiating a new communication process using the second protocol after completing a data exchange with the server using the first protocol.

18. The system of claim 17, wherein the completion of the data exchange occurs after a determination to dynamically switch from the first protocol to the second protocol.

19. A computer storage medium comprising computer-executable instructions stored thereon that, when executed by at least one processor, perform a method comprising:
determining a first communication protocol associated with an existing user account configured at a client application;
establishing, by the client application, a communication connection with a server using the first communication protocol;
communicating with the server using the first communication protocol, wherein communicating with the server using the first communication protocol further comprises executing a first client application; and
dynamically switching between the first communication protocol and a second communication protocol by:
sending a notice to the server using the first communication protocol, the notice indicating that a client supports a second communication protocol;
changing a connection process of the client by reconfiguring state data for the client;
reestablishing a communication connection with the server using the second communication protocol; and
communicating with the server using the second communication protocol over the communication connection, wherein communicating with the server using the second communication protocol over the communication connection includes resuming execution of the first client application configured with the existing user account.

20. The computer storage medium of claim 19, further comprising:
receiving data from the server for implementing the second communication protocol based on the notice; and
in response to the receiving of the data from the server, changing the connection process of the client by reconfiguring state data for the client, and reestablishing the communication connection with the server using the second communication protocol.

* * * * *